W. G. LADD, Jr.
Fluid Level.
No. 7,263.
Patented April 9, 1850.
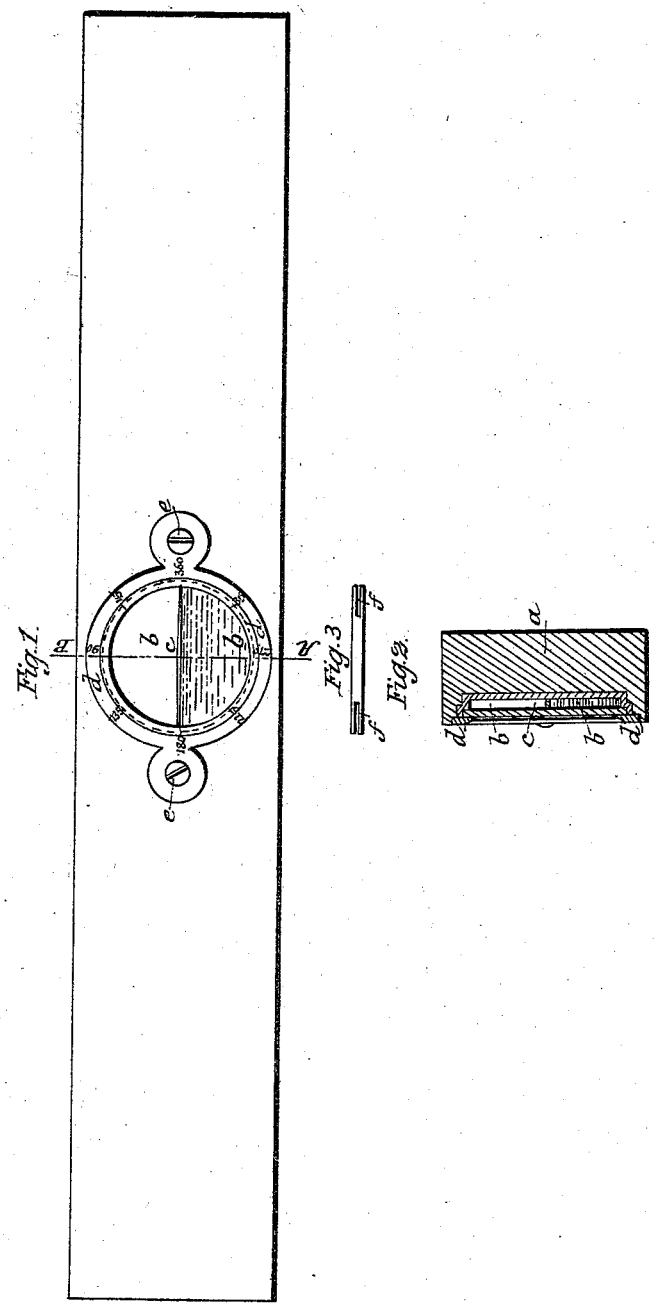

UNITED STATES PATENT OFFICE.

WILLIAM G. LADD, JR., OF CAMBRIDGE, MASSACHUSETTS.

FLUID-LEVEL.

Specification of Letters Patent No. 7,263, dated April 9, 1850.

*To all whom it may concern:*

Be it known that I, WILLIAM G. LADD, Jr., of Cambridge, in the county of Middlesex and State of Massachusetts, have invented certain new and useful Improvements in Levels, so as to Adapt Them to the Measurement of Inclinations, Slopes, and that the follow description, taken in connection with the accompanying drawings hereinafter referred to, forms a full and exact specification of the same, wherein I have set forth the nature and principles of my said invention, by which it may be distinguished from others of a similar class, together with such parts as I claim and desire to have secured to me by Letters Patent.

The figures of the accompanying plate of drawings represent my improvements.

Figure 1 is a side elevation of my improved level. Fig. 2 is a transverse vertical section of the same taken in the plane of the line A, B Fig. 1, and Fig. 3 is a detail plan of the indicator or needle.

The purpose of my improvements is, as above suggested, not only to determine level lines, but also to determine the angle which inclinations or slopes make with level lines, and furthermore, by the same level, to determine vertical or perpendicular lines as well as horizontal ones,—thereby superceding the use of the extra level tube for said purpose, which is now commonly arranged at right angles to the one for determining horizontal lines.

My improvement consists in employing, in lieu of the common cylindrical tube containing spirit, (and usually set in the edge or on one side of the bar of the piece of wood used,) a circular shallow vessel or cylinder set in a proper mortise formed in one face of the said bar,—said vessel or shallow cylinder being about half filled with quicksilver or some other liquid and hermetically sealed, and having a needle or indicator floating on the top of said liquid, the ends of which point to the number of degrees on an annular metallic dial, surrounding the said shallow cylinder, and which is properly graduated for the purpose.

In the drawings, *a a* represent the bar of wood with the edges made properly straight.

*b b* is the shallow cylindrical vessel in which the liquid is confined, the front of which should be of glass,—but the remainder may be made of metal, if properly protected against oxidation. The liquid is placed in this cylinder *b b* as shown in Figs. 1 and 2 so as to about half fill it when the bar *a a* is so held as to present the cylinder edgewise, as shown in said figures. A floating needle or indicator *c*, Figs. 1 and 2, made of any suitable material, rests on the top of the liquid, as above suggested and as shown in the drawings. An annular dial *d d* properly graduated to degrees &c. is fastened over the edge of the cylinder *b b*, as shown in Figs. 1 and 2, being confined to the bar *a a* by the screws *e e* Fig. 1, and the needle or indicator denotes the degrees of inclination on said dial of any slope. In order that quick silver or other liquid may always get under the needle when the tool is in use, there should be a slot *f f* formed in each end, as shown in Fig. 3, or in any other suitable way to permit said liquid to run through to the underside, when it gets on the upper side of said needle.

It will readily be preceived, that the top surface of the liquid may be used to denote the angle of inclination, &c., and the use of the needle or indicator may be superceded. It will also be apparent, that in lieu of the cylindrical vessel for containing the leveling fluid, an annular tube may be used, the surface of the liquid indicating horizontal or perpendicular or inclined position of the adjusting or working edge of the bar, the liquid in all cases being free to traverse around the entire circle of the tube or vessel.

Having thus described my improvements in levels, I shall state my claim as follows,—

What I claim as my invention and desire to have secured to me by Letters Patent, is—

A level for determining a horizontal and perpendicular line and the inclination of any slope with the same, constructed substantially as herein above set forth, that is, with a shallow cylindrical vessel or a tube in the shape of an entire ring, half filled with quicksilver or other liquid, in combination with a graduated annular dial, whether a floating needle or indicator be used or not, the whole arrangement being substantially as herein above set forth.

In testimony that the foregoing is a true description of my said invention and improvements I have hereto set my signature this thirty-first day of December in the year 1849.

WM. G. LADD, JR.

Witnesses:
 EZRA LINCOLN, Jr.
 J. GILES.